US010448173B2

(12) United States Patent
Hesselballe et al.

(10) Patent No.: US 10,448,173 B2
(45) Date of Patent: Oct. 15, 2019

(54) ANTENNA FOR A HEARING ASSISTANCE DEVICE

(71) Applicant: Widex A/S, Lynge (DK)

(72) Inventors: Jan Hesselballe, Soborg (DK); Martin Rosqvist, Limhamn (SE); Niels Christian Damgaard Jakobsen, Varlose (DK)

(73) Assignee: Widex A/S, Lynge (DK)

( * ) Notice: Subject to any disclaimer, the term of this patent is extended or adjusted under 35 U.S.C. 154(b) by 0 days.

(21) Appl. No.: 16/158,479

(22) Filed: Oct. 12, 2018

(65) Prior Publication Data

US 2019/0116431 A1    Apr. 18, 2019

Related U.S. Application Data

(60) Provisional application No. 62/572,892, filed on Oct. 16, 2017.

(51) Int. Cl.
*H04B 5/00* (2006.01)
*H04R 25/00* (2006.01)
(Continued)

(52) U.S. Cl.
CPC ......... *H04R 25/554* (2013.01); *H01Q 1/2291* (2013.01); *H01Q 1/273* (2013.01);
(Continued)

(58) Field of Classification Search
CPC ........ H04R 25/55; H04R 25/60; H04R 25/65; H04R 25/608; H04R 25/658;
(Continued)

(56) References Cited

U.S. PATENT DOCUMENTS 7,742,614 B2 * 6/2010 Christensen ........... H01Q 1/273
455/575.5
9,237,405 B2   1/2016 Pinto
(Continued)

FOREIGN PATENT DOCUMENTS

DE    10 2015 208 845 B3    8/2016
EP        1 465 457 A2    10/2004
(Continued)

OTHER PUBLICATIONS

Communication dated Jan. 7, 2019 from the European Patent Office in counterpart European Application No. 18194985.0.
(Continued)

*Primary Examiner* — Quochien B Vuong
(74) *Attorney, Agent, or Firm* — Sughrue Mion, PLLC

(57) ABSTRACT

A hearing assistance device includes a housing component (12) hosting a transceiver (68) and processing circuitry arranged in a compact block structure (50). A small feed loop (40) is mounted on the compact block structure (50), and is electrically connected to the transceiver (68). The compact block structure (50) is adapted for carrying the small feed loop (40), and the housing component (12) includes an integrated antenna element (30, 80). The housing component (12) and the compact block structure (50) are provided with a set of cooperating mechanical guiding components for maintaining the small feed loop (40) and the antenna element (30, 80) in a well-defined mechanical connection.

13 Claims, 5 Drawing Sheets

(51) Int. Cl.
*H01Q 9/24* (2006.01)
*H01Q 1/27* (2006.01)
*H01Q 7/00* (2006.01)
*H01Q 9/26* (2006.01)
*H04B 1/3827* (2015.01)
*H01Q 1/22* (2006.01)

(52) U.S. Cl.
CPC ............... *H01Q 7/00* (2013.01); *H01Q 9/26* (2013.01); *H04B 1/385* (2013.01); *H04R 25/658* (2013.01); *H04R 2225/51* (2013.01)

(58) Field of Classification Search
CPC ........ H04R 2225/021; H04R 2225/025; H04R 2225/51; H04R 2225/63; H04R 2225/77; H01Q 1/243; H01Q 1/273; H01Q 7/00; H01Q 9/42; H04M 1/0216; H04M 1/72591
USPC ............ 455/41.1, 41.2, 556.1, 575.1, 575.7; 381/315, 322, 328
See application file for complete search history.

(56) References Cited

U.S. PATENT DOCUMENTS

| | | | |
|---|---|---|---|
| 9,397,399 | B2 | 7/2016 | Pajona et al. |
| 9,408,003 | B2 | 8/2016 | Kvist |
| 9,408,005 | B2* | 8/2016 | Jeppesen .............. H04R 25/556 |
| 9,472,848 | B2 | 10/2016 | Pajona et al. |
| 9,635,475 | B2 | 4/2017 | Polinske et al. |
| 9,686,621 | B2 | 6/2017 | Akdeniz et al. |
| 9,729,979 | B2* | 8/2017 | Ozden .................... H01Q 1/273 |
| 9,743,198 | B2* | 8/2017 | Bergner ............... H04R 25/608 |
| 9,807,523 | B2* | 10/2017 | Murray .................. H04R 31/00 |
| 9,980,062 | B2* | 5/2018 | Fischer ................ H04R 25/554 |
| 2005/0244024 | A1 | 11/2005 | Fischer et al. |
| 2006/0152411 | A1 | 7/2006 | Iguchi et al. |
| 2010/0097285 | A1 | 4/2010 | Hayashi et al. |
| 2011/0142270 | A1 | 6/2011 | Niederdrank |
| 2015/0023529 | A1 | 1/2015 | Barzen et al. |
| 2015/0030190 | A1 | 1/2015 | Rabel et al. |
| 2015/0131830 | A1 | 5/2015 | Pinto |
| 2015/0296312 | A1 | 10/2015 | Nikles et al. |
| 2016/0050501 | A1 | 2/2016 | Pinto |
| 2016/0173998 | A1 | 6/2016 | Bauman et al. |
| 2016/0295335 | A1 | 10/2016 | Vajha et al. |
| 2016/0337766 | A1 | 11/2016 | Flaig |
| 2017/0064466 | A1* | 3/2017 | Pooladian .............. H04R 25/65 |
| 2017/0064467 | A1 | 3/2017 | Fischer et al. |
| 2019/0069101 | A1* | 2/2019 | Kvist .................... H04R 25/554 |

FOREIGN PATENT DOCUMENTS

| | | |
|---|---|---|
| EP | 1 538 703 A1 | 6/2005 |
| EP | 2 120 292 A1 | 11/2009 |
| EP | 2 835 862 A1 | 2/2015 |
| EP | 2 985 834 A1 | 2/2016 |
| EP | 3 076 481 A1 | 10/2016 |
| WO | 2013/007868 A1 | 1/2013 |

OTHER PUBLICATIONS

International Search Report, issued by International Searching Authority in corresponding International Application No. PCT/EP2018/075422, dated Jan. 7, 2019.

Written Opinion issued by the International Bureau in corresponding International Application No. PCT/EP2018/075422, dated Jan. 7, 2019.

"Inductance and Magnetic Energy", Chapter 11, Massachusetts Institute of Technology MIT OpenCourseware, Jan. 12, 2009, 53 pages, Cambridge, Massachusetts, US.

* cited by examiner

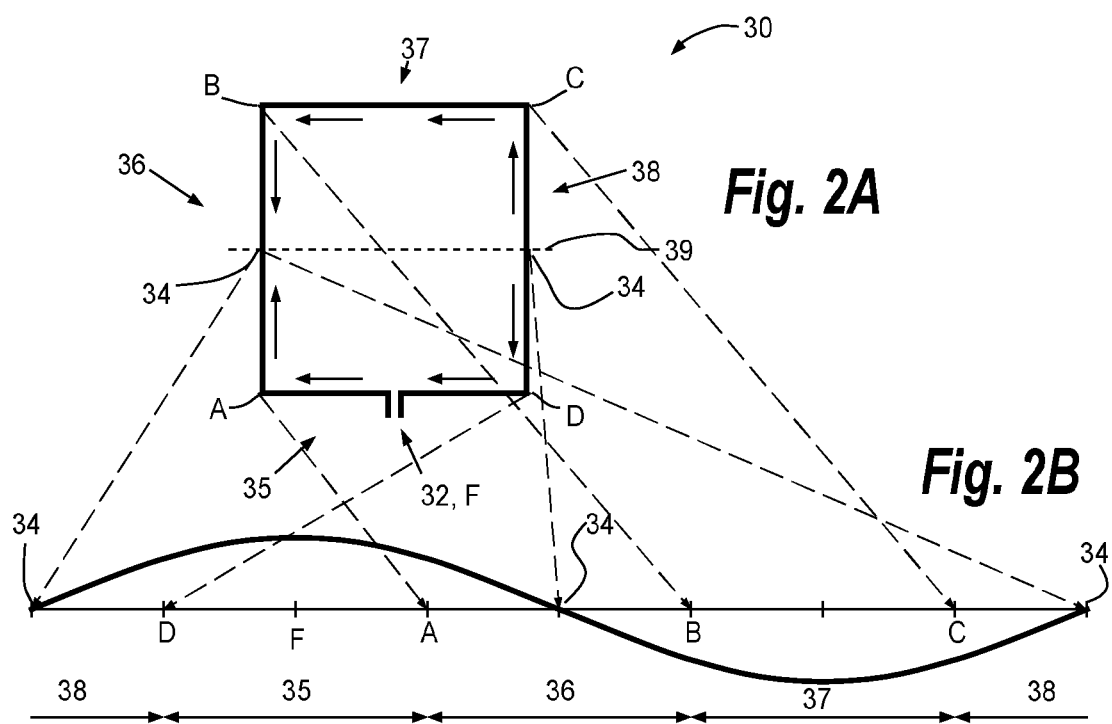
*Fig. 2A*
*Fig. 2B*
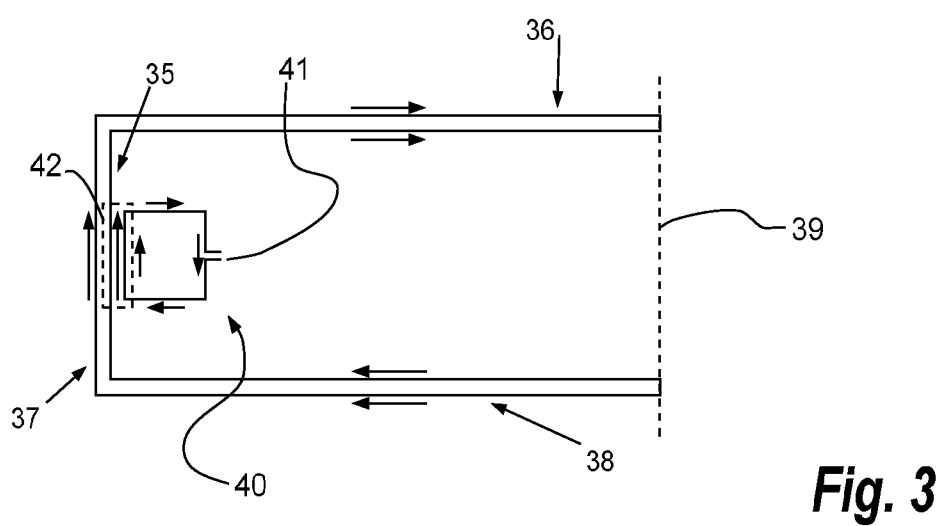
*Fig. 3*

ANTENNA FOR A HEARING ASSISTANCE DEVICE

CROSS-REFERENCE TO RELATED APPLICATIONS

This application claims benefit of provisional application 62/572,892 filed Oct. 16, 2017, and is related to the following U.S. applications: (1) PCT International Application PCT/EP2018/075422, filed Sep. 20, 2018 and entitled "Antenna For A Hearing Assistance Device," (2) U.S. application Ser. No. 16/158,635 filed Oct. 12, 2018 and entitled "Antenna For A Hearing Assistance Device," (3) U.S. application Ser. No. 16/158,469 filed Oct. 12, 2018 and entitled "Antenna For A Hearing Assistance Device," and (4) U.S. application Ser. No. 16/158,675 filed Oct. 12, 2018 and entitled "Antenna For A Hearing Assistance Device," the disclosures of all of which are incorporated by reference herein.

BACKGROUND OF THE INVENTION

The present invention relates to an antenna for a hearing assistance device. The invention, more particularly, relates to an antenna element being electromagnetically coupled to a feed line via a feed element. Also, the invention relates to a method of manufacturing such a hearing assistance device.

When designing a hearing assistive device adapted for short range communication via e.g. Bluetooth™, the housing of the hearing assistive device must host an antenna of a considerable length.

SUMMARY OF THE INVENTION

The purpose of the invention is to provide a hearing assistance device with an antenna element adapted for a compact design of the hearing assistance device.

This purpose is according to the invention achieved by a hearing assistance device comprising a housing component including a transceiver and processing circuitry arranged in a compact block structure, and a small feed loop mounted on the compact block structure, and being electrically connected to the transceiver. The compact block structure is adapted for carrying the small feed loop. The housing component comprises an integrated antenna element. The housing component and the compact block structure are provided with a set of cooperating mechanical guiding components for maintaining the small feed loop and the antenna element in a well-defined mechanical connection. By establishing an electromagnetic coupling between the antenna and the antenna feed, the manufacturing of the hearing assistive device becomes less critical as the mechanics guides the operator towards a good quality connection. The connection also becomes more robust about mechanical impact, e.g. caused by dropping.

In one embodiment, the set of cooperating mechanical guiding components includes a recess surrounded by the small feed loop on the compact block structure, and a protrusion provided on the housing component. Preferably, the recess and the protrusion are shaped as mated truncated pyramids.

In another embodiment, the set of cooperating mechanical guiding components includes a cavity in the housing component and being adapted to receive the neck part of the compact block structure. The small feed loop and the antenna element establish an electromagnetic coupling along at least half of the circumference of the neck part of the compact block structure, when the compact block structure is received in the housing component.

In one embodiment, the antenna element is configured as a loop antenna, and in another embodiment the antenna element is a folded dipole.

According to a second aspect of the invention, there is provided a method of manufacturing a hearing assistance device, the method comprises steps of providing the housing component and the compact block structure with a set of cooperating mechanical guiding components, mounting a small feed loop on the compact block structure, and connecting the small feed loop electrically to the transceiver, providing an antenna element as an integral part of a housing component, and aligning the housing component and the compact block structure by means of the set of cooperating mechanical guiding components for establishing and maintaining a well-defined mechanical connection between the small feed loop and the antenna element.

BRIEF DESCRIPTION OF THE DRAWINGS

The invention will be described in further detail with reference to preferred aspects and the accompanying drawing, in which:

FIG. 2A shows a loop antenna, and FIG. 2B shows the current distribution for the loop antenna shown in FIG. 2A;

FIG. 3 shows a folded loop antenna having a small loop as feed according to one embodiment of the invention;

DETAILED DESCRIPTION

Figure 1:
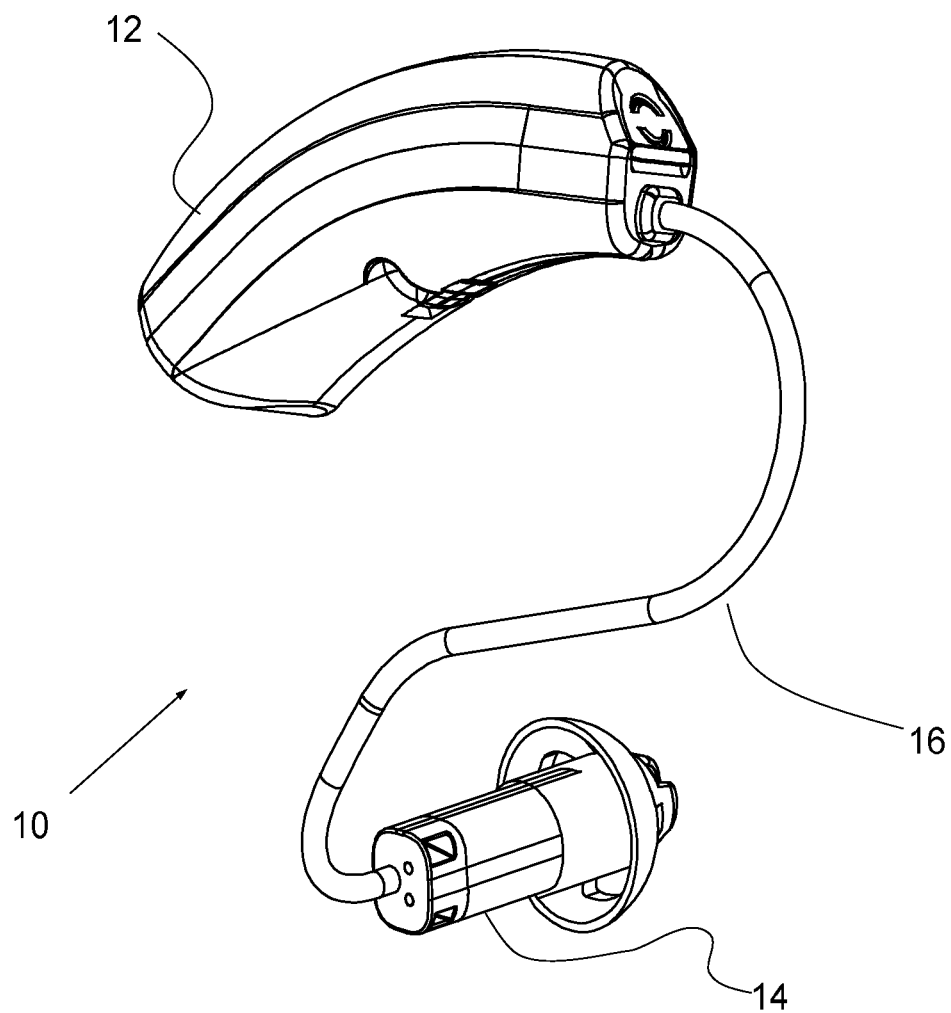
FIG. 1 shows a head-worn device according to one embodiment of the invention.

A hearing assistive device is according to one embodiment of the invention a hearing aid 10 and is shown in FIG. 1. The hearing aid 10 comprises a Behind-The-Ear (BTE) housing component 12 adapted for placement Behind-The-Ear (BTE), and to which there is attached an earpiece component 14. The major part of the electronics (including some microphones, a processor, a battery and preferably a short-range radio, e.g. Bluetooth based, and an inductive radio) of the hearing aid 10 is located inside of the housing component 12.

In one embodiment, the sound producing parts of the hearing aid 10 (including a speaker) are located inside of the earpiece component 14. The housing component 12 and the earpiece component 14 are interconnected by a cable 16 comprising two or more wires (not shown) for transferring audio processed in the housing component 12 to the speaker in the earpiece component 14, for powering components in the earpiece component 14, and/or for transferring audio picked up by a microphone (not shown) in the earpiece component 14 to the audio processing components in the housing component 12.

In one embodiment, the sound producing parts of the hearing aid 10 (including a speaker) are located inside of the housing component 12. The housing component 12 and the earpiece component 14 are interconnected by a sound tube (not shown) for passing sound produced by the speaker in the housing component 12 to an outlet in the earpiece component 14.

To illustrate the principles according to the invention, FIG. 2A shows a loop antenna, and the current direction for the loop antenna 30 is illustrated by arrows along the loop. A loop antenna 30 is a radio antenna consisting of a loop or coil of wire, tubing, or other electrical conductor with its ends often connected e.g. to a balanced transmission line or to a balun. There are two distinct designs for loops. The first one is a resonant loop antenna with a circumference close to the intended wavelength of operation. The second one is a small loop with a size much smaller than one wavelength.

The loop antenna 30 is a resonant loop antenna, and its size is governed by the intended wavelength of operation. A loop antenna 30 intended to operate in the ISM band at approximately 2.4 GHz, the wavelength will be around 12.5 cm. For simplicity, the loop antenna 30 shown in FIG. 2A is a square. However, in a real implementation, other shapes will be preferred due to the shape of the housing component 12. The illustrated loop antenna 30 has an antenna feed, 32 or F, feeding an antenna signal into the loop antenna 30. The square shaped loop antenna 30 shown in FIG. 2A has four sides or antenna segments 35, 36, 37, and 38, each having (in the illustrated example) a length corresponding to a quarter wavelength, and four corners A, B, C, and D. The current distribution along the loop antenna 30 is shown in FIG. 2B. It is seen that the antenna 30, at the specific antenna is resonant. Resonance is a phenomenon in which the feed 32 drives the antenna 30 to oscillate with greater amplitude at a specific frequency. The maximum current occurs at the center part of the antenna segment 35 at the feed 32 (or F), and at the center part of the antenna segment 37 (the current is opposed due to the negative amplitude). Furthermore, the loop antenna 30 exhibits two minimum current nodes 34 where the absolute current is close to zero. These two minimum current nodes 34 defines a folding line 39 for a folded loop antenna.

FIG. 3 illustrates a folded loop antenna 40 obtained by folding the loop antenna 30 (FIG. 2A) along the folding line 39. The length of the antenna segments 36 and 38 has been extended relatively to the length of the antenna segments 35 and 37 to fit better to the form factor a hearing aid of the type shown in FIG. 1. However, the folded loop antenna 40 is still resonant as the total length of the four sides or antenna segments 35, 36, 37, and 38 corresponds to one wavelength. The feed 32 still drives the folded loop antenna 40 via the antenna segment 35.

FIG. 3 shows how a small loop 40 has a feed 41 adapted for receiving an excitation signal from a transceiver 68 of a hearing aid. The transceiver 68 comprises both the transmitter and the receiver functionality sharing common circuitry. The small loop 40 will couple to the resonant loop antenna 30 via a coupling 42. Hereby, the small loop 40 will couple to and excite a current in the resonant loop antenna 30. In one embodiment, the four sides of the small loop 40 has a total length corresponding to approximately 10% of the wavelength of the frequency band of the resonant loop antenna 30. In one embodiment, the total length of the small loop 40 is adapted to have a substantial constant current distribution along the loop.

Small loops have low radiation resistance and thus poor radiation efficiency. A small loop generally has a circumference around one tenth of a wavelength, in which case there will be a relatively constant current distribution along the conductor. The antenna has some of the characteristics of a resonant loop but is not resonant.

Figure 5:
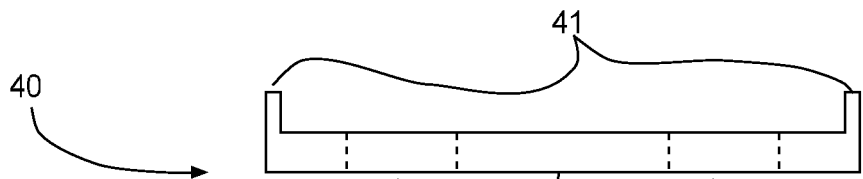
FIG. 5 shows an un-folded small loop for use in an embodiment of a small loop according to the invention.
Figure 6:
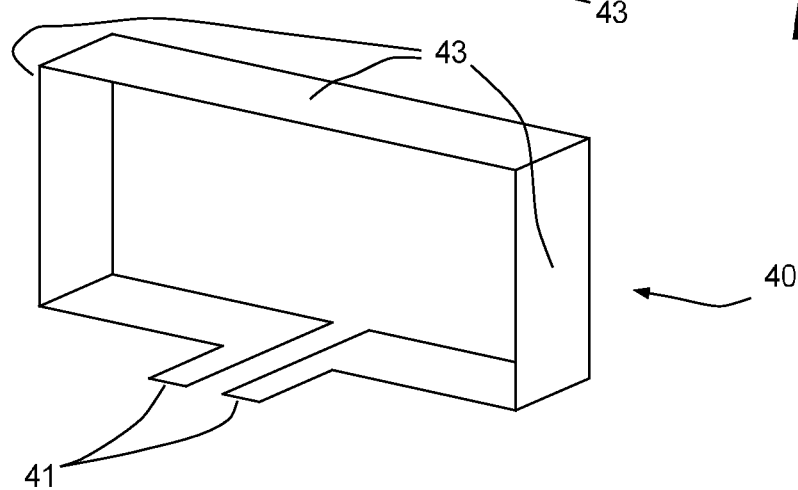
FIG. 6 shows an embodiment of a small loop according to the invention.

FIG. 5 schematically illustrates an un-folded small loop 40 provided from a cut metal sheet, e.g. of steel or silver. The un-folded small loop 40 have a set of paths providing the feed 41. Folding lines are marked in dotted lines. A central part 43 of the un-folded small loop 40 serves as coupling 42 when feeding the resonant loop antenna 30. FIG. 6 schematically illustrates an embodiment of a small loop 40 according to the invention.

Figure 4:
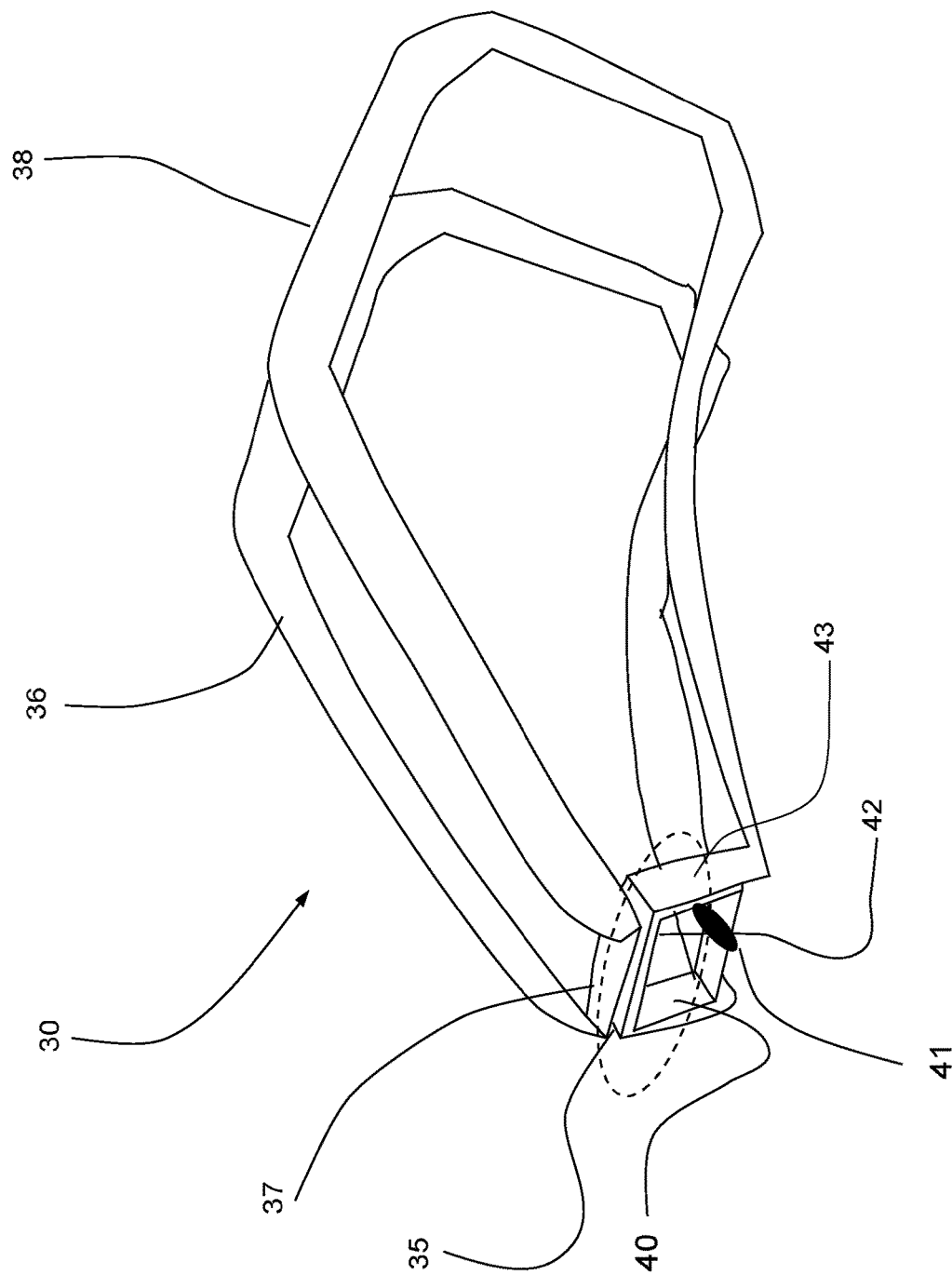
FIG. 4 shows in perspective a folded loop antenna having a small loop as feed according to one embodiment of the invention.

FIG. 4 shows an embodiment of a folded loop antenna 30 fed by a small loop 40 according to one embodiment of the invention. The feed 41 feeds an excitation signal from a transceiver 68 of a hearing aid to the small loop 40. The small loop 40 will couple to the resonant loop antenna 30 via a mutual induction coupling 42 provided by parallel loop segment 43 and 35 (and parts of the loop segments 36 and 38). It is seen that the loop segment 37 is close to the small loop 40, thus the small loop 40 will couple to the folded loop antenna 30 in the loop segment 37 area as well.

Hereby, the small loop 40 will couple to and excite a current in the resonant loop antenna 30. The circumference of the small feed loop 40 is between 5 and 20% of a wavelength. Preferably, the circumference of the small feed loop 40 is approximately a tenth of a wavelength. In one embodiment, the mutual induction coupling 42 extends along half of the circumference of the small feed loop 40. In one embodiment, the mutual induction coupling 42 extends along the circumference of the small feed loop 40 in a length corresponding to 3-6% of the wavelength of the signal emitted by the resonant loop antenna 30.

Figure 7:
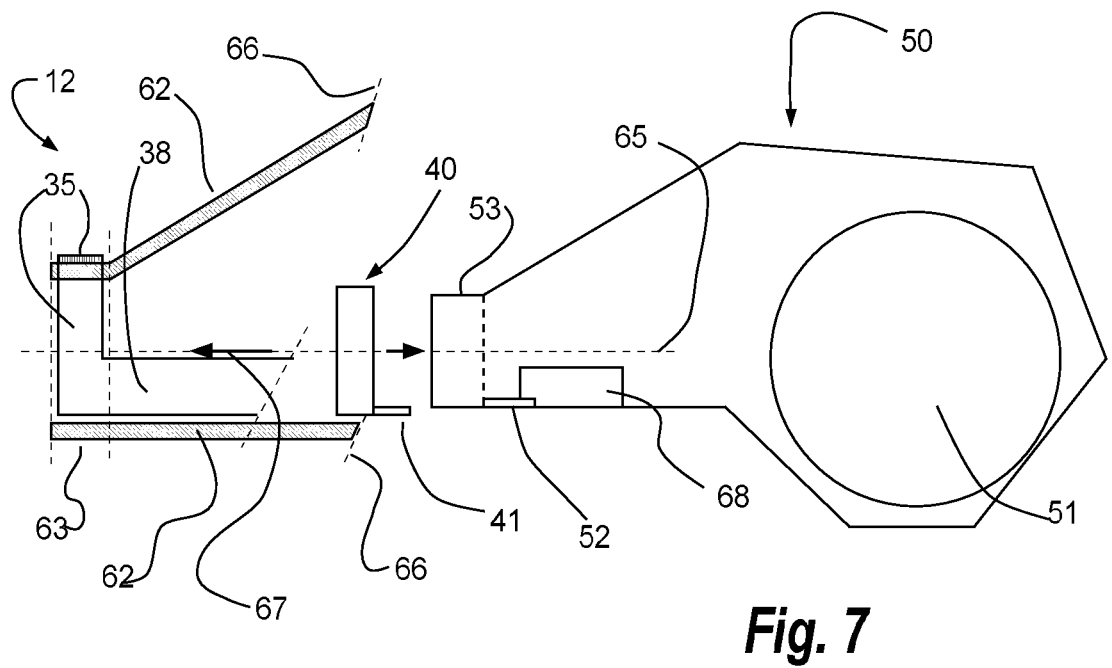
FIG. 7 shows partly in cross-section how to obtain a reliable positioning between a feed element and an antenna element according to one embodiment of the invention.

The major part of the electronics, including some microphones, a processor, a battery 51, a short-range radio, and an inductive radio, is located inside of the housing component 12. Traditionally, the electronics are arranged in a compact block structure 50, which is illustrated in FIG. 7. The compact block structure 50 is adapted to substantially fill out the cavity provided by the housing component 12. The battery 51 may be inserted into the compact block structure 50 via a not shown battery door. The compact block structure 50 has a neck part 53 adapted to receive the small loop 40. Furthermore, the compact block structure 50 has a pair of soldering pads 52 through which the small feed loop 40 will be connected to the short-range radio of the hearing aid 10. The small feed loop 40 is soldered to the soldering pads 52 during the manufacturing of the compact block structure 50. Hereby, the small feed loop 40 and the compact block structure 50 becomes coherent or integral. The neck part 53 also serves as anchoring element for an ear-wire plug for a RIC or RITE hearing aid, or for a sound tube for a BTE hearing aid.

FIG. 7 furthermore shows partly in cross-section a part of walls 62 of the housing component 12, where the walls 62 continues toward right but are discontinued due to clarity as marked by the dotted lines 66. The walls 62 provides a neck part 63 adapted to encloses the neck part 53 of the compact block structure 50 when the hearing device is assembled. The housing component 12, and thereby the walls 62, are manufactured by injection molding of a thermoplastic material. Thermoplastics may be reshaped by heating and acts as a dielectric material when used for manufacturing the housing component 12.

The small loop element 40 extends along the periphery of the neck 53 of the compact block structure 50. The resonant loop antenna 30 has an antenna segment 35 extending along the periphery of the neck 63 of the housing component 12. A substantial part of the small loop element 40 is enclosed by the antenna segment 35 and separated therefrom by the neck wall 63, whereby the mutual induction coupling between the feed element and the antenna element is provided. The neck wall 63 has a substantial uniform thickness. The small loop element 40 and the antenna segment 35 are, as seen, arranged substantially orthogonal to the longitudinal axis 65 of the compact block structure 50. The antenna element 35 encloses the small loop element 40 along at least half of the periphery of the small loop element 40. It is furthermore seen that the antenna segment 35 continues in the antenna segment 38 extending in the longitudinal direction of the compact block structure 50.

Once the small loop element 40 has been soldered to the compact block structure 50, the compact block structure 50 is inserted into the housing component 12 as marked by the arrow 67, whereby the mechanical design ensures the correct positioning of the small loop element 40 relatively to the resonant loop antenna 30 ensuring that sufficient energy can be transferred between the small loop element 40 and the resonant loop antenna 30.

In the above, the antenna element 30 is described as being a resonant loop antenna, but in other embodiments the antenna element 30 can be a variety of other antenna types, such as a monopole, a dipole, a patch, a spiral, a slot, or an aperture. The antenna element 30 may be manufactured using various antenna manufacturing techniques. The antenna element 30 can be mounted on and external to the housing component 12.

A current in the feed loop in transmission mode will create an electromagnetic field, and when the created electromagnetic field is induced into the antenna element situated within the same magnetic field, the electromagnetic field is said to be induced magnetically, inductively or by mutual induction. In receiving mode, the current in the antenna element will induce a current in the feed loop by mutual induction, and the feed loop will deliver the current to the receiver. When the two loops are magnetically linked together by a common magnetic flux they are said to have the property of mutual inductance. This is the situation for the embodiments shown in FIG. 4 and FIG. 7. The mutual inductance is present when the current flowing in the feed loop, induces a corresponding current in an adjacent antenna loop.

The direction of the induced current in the antenna element 30 relatively to the current in the small feed loop 40 depends the antenna impedance.

In one embodiment, the antenna element 30 is manufactured by adding a metallic pattern to housing component in a Laser Direct Structuring (LDS) process. The metallic pattern is in one embodiment provided on the outer surface of the housing component 12, whereby the radiated power from the antenna element 30 is not attenuated when passing through the dielectric walls of the housing component 12.

The LDS process is based on a thermoplastic material doped with a (non-conductive) metallic inorganic compound. The metallic inorganic compound is activated by means of laser. The housing component 12 is injection molded in a single shot (single-component injection molding), with almost no limitation in the design freedom. A laser then selectively exposes the course of the later circuit trace on the housing component 12 with a laser beam. Where the laser beam hits the plastic, the metal additive forms a micro-rough track. The metal particles of this track afterwards form the nuclei for a subsequent metallization. In an electroless copper bath, the conductor path layers arise precisely on these tracks. Successively layers of copper, nickel and gold finish can be raised in this way. The LDS process may be applied to the internal as well as to the external surface of the housing component 12.

Figure 8:
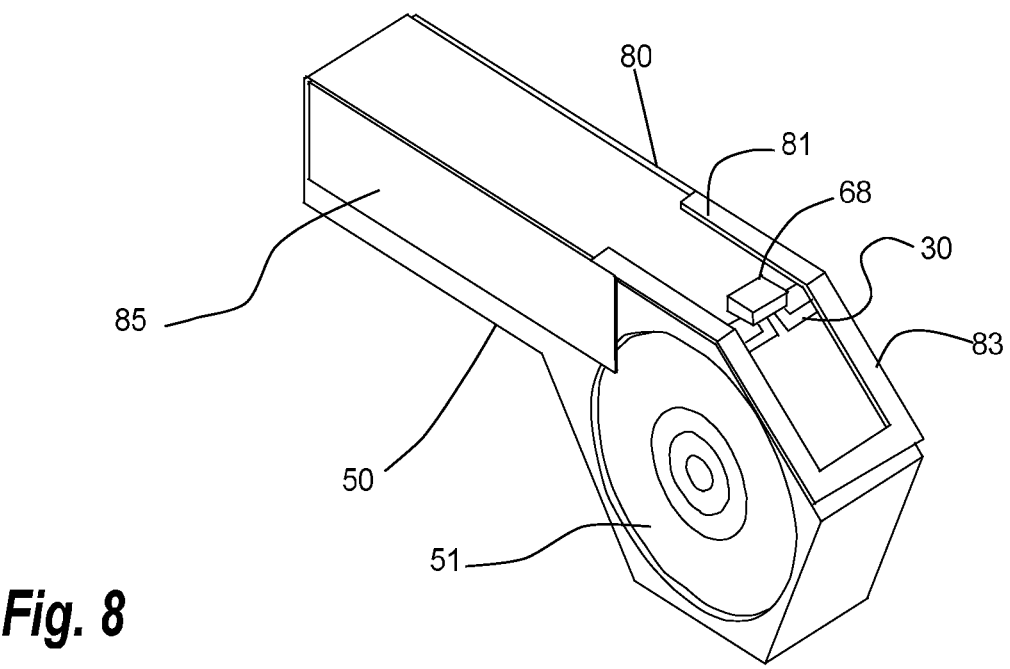
FIG. 8 shows an embodiment of an antenna construction for a hearing assistance device according to the invention.
Figure 9:
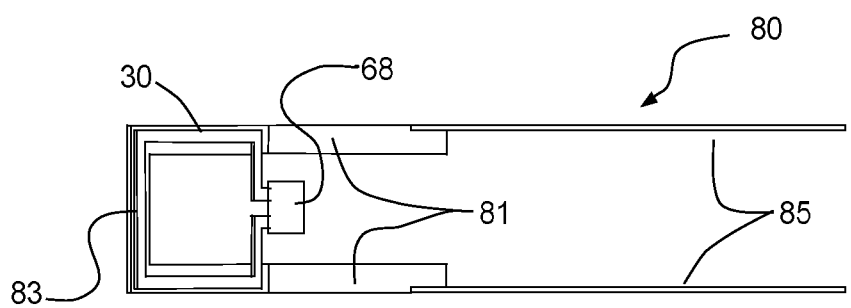
FIG. 9 shows the antenna construction of the embodiment shown in FIG. 8 seen from beneath.

FIGS. 8 and 9 shows an embodiment of an antenna construction for a hearing assistance device according to the invention. The compact block structure 50 hosting the battery 51 and the transceiver 68, carries the small feed loop 40 connected to the transceiver 68. An antenna element 80 is mounted on the inner wall of the housing component 12, e.g. in an LDS process, as an insert in an injection molding process, or attached prior to the final assembling of the hearing assistance device. However, in FIGS. 8 and 9, housing component 12 is omitted for clarity. The small feed loop 40 and the antenna element 80 are provided a metal paths or patches. The antenna element 80 has a coupling portion 83 overlaying the small feed loop 40. The coupling portion 83 ensures the mutual induction between the small loop 40 and the dipole antenna 80. The antenna element 80 is configured as a folded dipole. The coupling portion 83 of the antenna element 80 continues via a bent into two mid-sections 81 following the shape of the housing component 12. The mid-sections 81 are terminated in respective patches 85. The coupling portion 83 and the mid-sections 81 are extending along the top wall of the hearing assistance device, and the two patches 85 are extending along the side walls of the hearing assistance device.

The dipole antenna commonly consists of two identical conductive elements being bilaterally symmetrical. Dipoles are resonant antennas, meaning that the conductive elements serve as resonators, with standing waves of radio current flowing back and forth between their ends. The shown antenna element 80 is a half-wave dipole, in which each of the two conductive elements are approximately ¼ wavelength long.

FIG. 9 shows the antenna construction of the embodiment shown in FIG. 8 seen from beneath. It is seen that the coupling portion 83 overlays the small feed loop 40. The coupling portion 83 and the small feed loop 40 are arranged in two parallel planes close to each other but separated by air or an appropriate not-shown dielectric material. The coupling portion 83 and the small feed loop 40 are magnetically linked together by a common magnetic flux, whereby the coupling is provided by mutual inductance.

Figure 10:
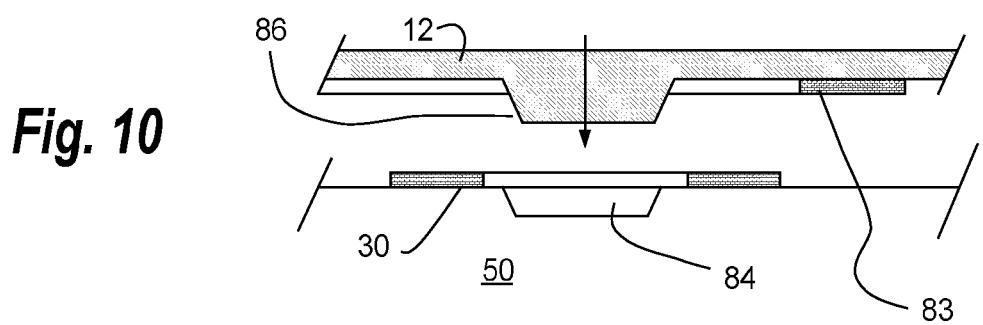
FIG. 10 shows an embodiment of the mechanical construction enabling a reliable mutual induction between a small feed loop and the antenna element.

In one embodiment illustrated in cross-section in FIG. 10, the small feed loop 40 is provided on the compact block structure 50 (only shown in part). The small feed loop 40 is arranged as a rectangle surrounding a recess 84. The recess 84 is adapted to receive a protrusion 86 provided on the housing component 12 (only shown in part). The protrusion 86 is surrounded by a coupling part 83 of an antenna element 80. In this embodiment the antenna element 80 is configured as a folded dipole (patch). The purpose of the cooperating recess 84 and protrusion 86 is to maintain the small feed loop 40 and the antenna element 80 in a well-defined and reliable mechanical connection. In the illustrated embodiment, the recess 84 and the protrusion 86 are shaped as mated truncated pyramids, but other shapes may be preferred in other embodiments.

The antenna element 80 is surrounding the protrusion 86 on the inner side of the housing component 12. At least half of the periphery of the small feed loop 40 is provided adjacent to and within the antenna element 80. The small feed loop 40 and the antenna element 80 are provided a metal paths or patches, and in one embodiment the patches are arranged, at least around the small feed loop 40, substantially within the same plane. The small feed loop 40 is provided on top of the compact block structure 50 and is connected to the transceiver 68.

The invention claimed is:

1. A hearing assistance device comprising a housing component including a transceiver and processing circuitry arranged in a compact block structure, and a small feed loop mounted on the compact block structure, and being electrically connected to the transceiver;
    wherein the compact block structure is adapted for carrying the small feed loop;
    wherein the housing component comprises an integrated antenna element;
    wherein the housing component and the compact block structure are provided with a set of cooperating mechanical guiding components for maintaining the small feed loop and the antenna element in a well-defined mechanical connection;
wherein the set of cooperating mechanical guiding components includes a cavity in the housing component and being adapted to receive the neck part of the compact block structure; and
    wherein the small feed loop and the antenna element, when the compact block structure is received in the housing component, establish an electromagnetic coupling along at least half of the circumference of the neck part of the compact block structure.

2. The device of claim 1, wherein the set of cooperating mechanical guiding components includes
    a recess surrounded by the small feed loop on the compact block structure, and
    a protrusion provided on the housing component.

3. The device of claim 2, wherein the recess and the protrusion are shaped as mated truncated pyramids.

4. The hearing assistance device according to claim 1, wherein the neck part of the compact block structure carrying the small feed loop is also serving as anchoring element for an earpiece component.

5. The device of claim 1, wherein the antenna element is manufactured by adding a metallic pattern to the housing component in a Laser Direct Structuring (LDS) process.

6. The device of claim 1, wherein the antenna element is manufactured by adding a metallic insert to a molding form when molding the housing component in an injection molding process.

7. The device of claim 1, wherein the antenna element is adhered to the housing component by gluing or welding.

8. The device of claim 1, wherein the small feed loop has a circumference significantly below an intended wavelength of operation.

9. The device of claim 8, wherein the small feed loop during operation has a substantially constant current distribution along the loop.

10. The device of claim 1, wherein the antenna element is configured as a loop antenna.

11. The device of claim 1, wherein the antenna element is coupled to the feed element via mutual induction.

12. The device of claim 1, wherein the antenna element is a folded dipole.

13. A method of manufacturing a hearing assistance device comprising steps of:
    providing the housing component and the compact block structure with a set of cooperating mechanical guiding components;
    mounting a small feed loop on the compact block structure, and connecting the small feed loop electrically to the transceiver;
    providing an antenna element as an integral part of a housing component;
    aligning the housing component and the compact block structure by means of the set of cooperating mechanical guiding components for establishing and maintaining a well-defined mechanical connection between the small feed loop and the antenna element;
    wherein the set of cooperating mechanical guiding components includes a cavity in the housing component and being adapted to receive a neck part of the compact block structure; and
    wherein the small feed loop and the antenna element, when the compact block structure is received in the housing component, establish an electromagnetic coupling along at least half of the circumference of the neck part of the compact block structure.

* * * * *